J. A. TAFT.
ROUND BALE COTTON PRESS.
APPLICATION FILED JUNE 26, 1917.

1,333,351.

Patented Mar. 9, 1920.
3 SHEETS—SHEET 1.

Inventor:
John A. Taft
by Ramsey and Parmelee
Attys.

J. A. TAFT.
ROUND BALE COTTON PRESS.
APPLICATION FILED JUNE 26, 1917.
1,333,351.
Patented Mar. 9, 1920.
3 SHEETS—SHEET 2.
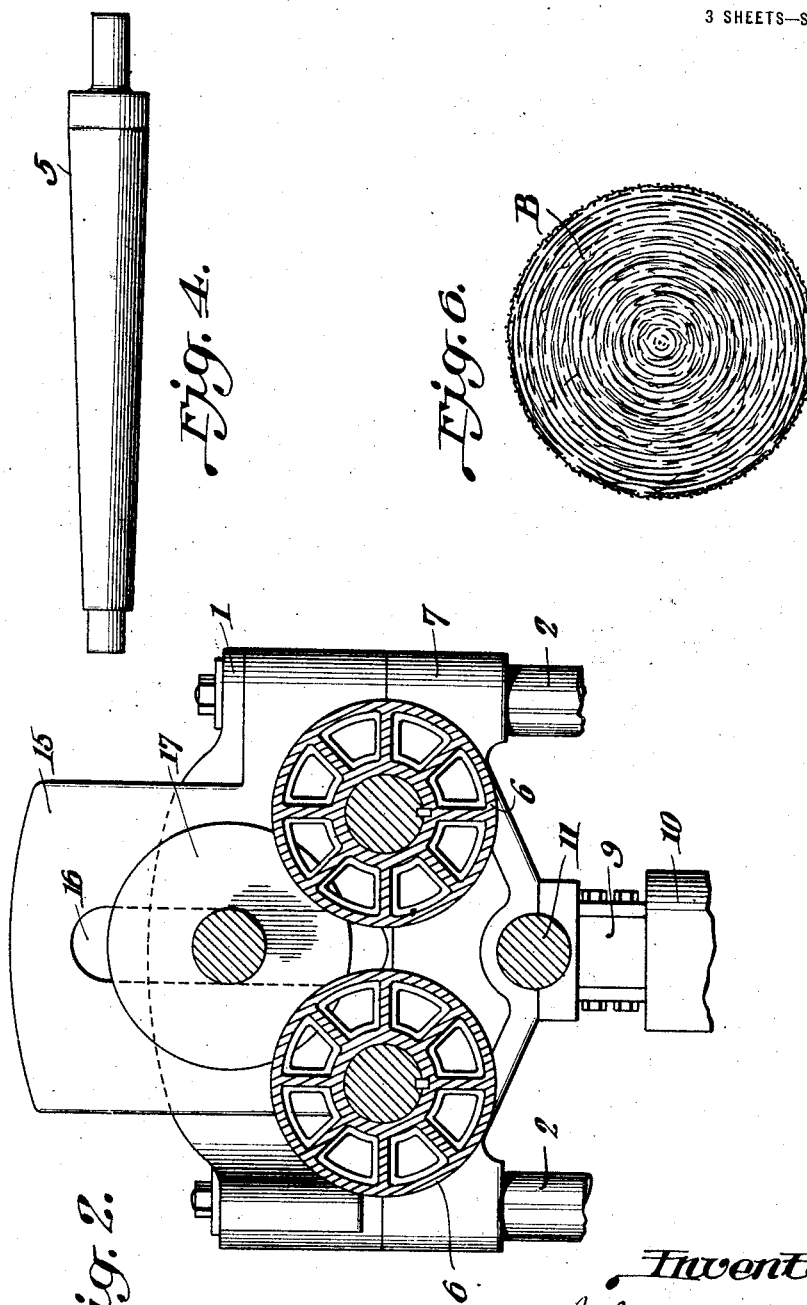

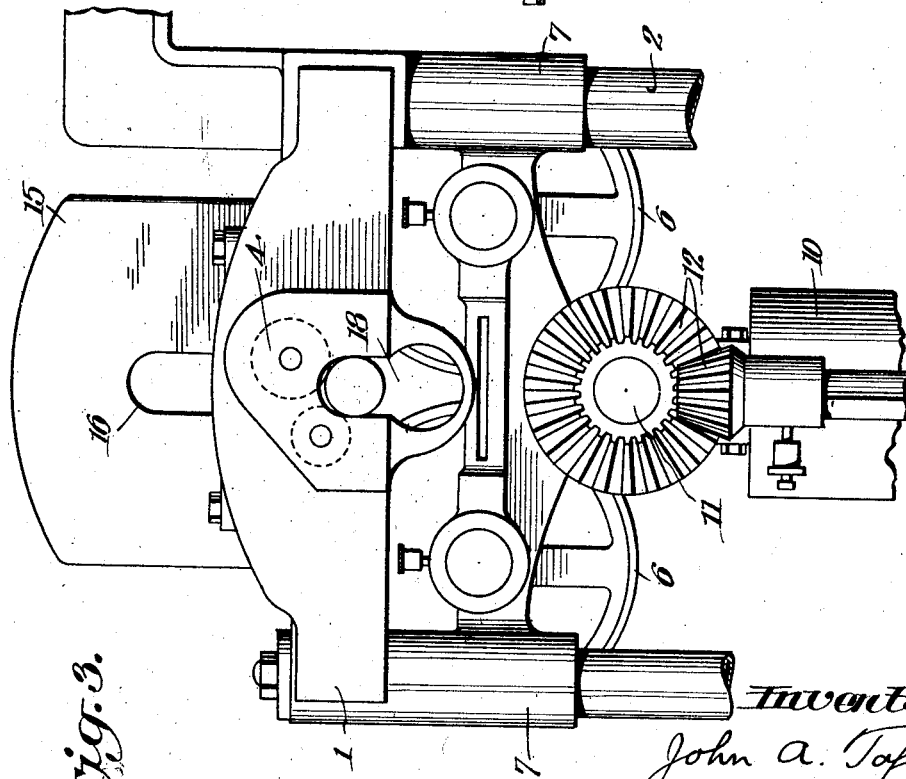

UNITED STATES PATENT OFFICE.

JOHN A. TAFT, OF SAN ANTONIO, TEXAS, ASSIGNOR TO REAGAN BALE COMPANY, OF SAN ANTONIO, TEXAS, A CORPORATION OF TEXAS.

ROUND-BALE COTTON-PRESS.

1,333,351.  Specification of Letters Patent.  Patented Mar. 9, 1920.

Application filed June 26, 1917. Serial No. 177,131.

*To all whom it may concern:*

Be it known that I, JOHN A. TAFT, a citizen of the United States, and a resident of the city of San Antonio, in the county of Bexar, State of Texas, have invented certain new and useful Improvements in Round-Bale Cotton-Presses, of which the following is a specification.

This invention relates broadly to presses and more particularly to details of a press for making round cotton bales.

The principal object of the present invention is to provide a suitable core and related devices comprising elements of a press for producing round cotton bales and wherein the core comprises a tapering steel member.

Another object of the present invention is to provide a round bale cotton press with suitable devices adjacent the ends of the core to properly form the ends of the bale, and which devices more particularly comprise traveling plates operating conjointly with rotating disks.

A still further object of the present invention is the provision of suitable mechanism for removing the core pin from a finished bale before the bale is taken from the press, and such mechanism comprises more particularly a hydraulic ram mounted in such manner as to permit the core pin being alined opposite to removal openings in the machine frame and to be moved endwise by the said ram whereby the taper on the core pin extending through the bale permits the ram to move the pin endwise and thereby release the said pin from the compressed cotton.

Other and further objects of the present invention will in part be obvious and will in part be pointed out hereinafter by reference to the accompanying drawings, wherein like parts are designated by like characters throughout the several views thereof.

Fig. 2 is a detail sectional view showing the circular end plate and the slidable end plate.

Fig. 3 is a detail end view showing the end of the core pin in position against the bearing rollers.

Fig. 4 is a view of the core pin.

Fig. 5 illustrates the core pin within the finished bale and showing the relation of the core pin and the end plates before the core pin is removed.

Fig. 6 is a sectional view through a circular bale after the core pin has been removed and illustrates the relative densities of portions of the bale.

Figure 1:
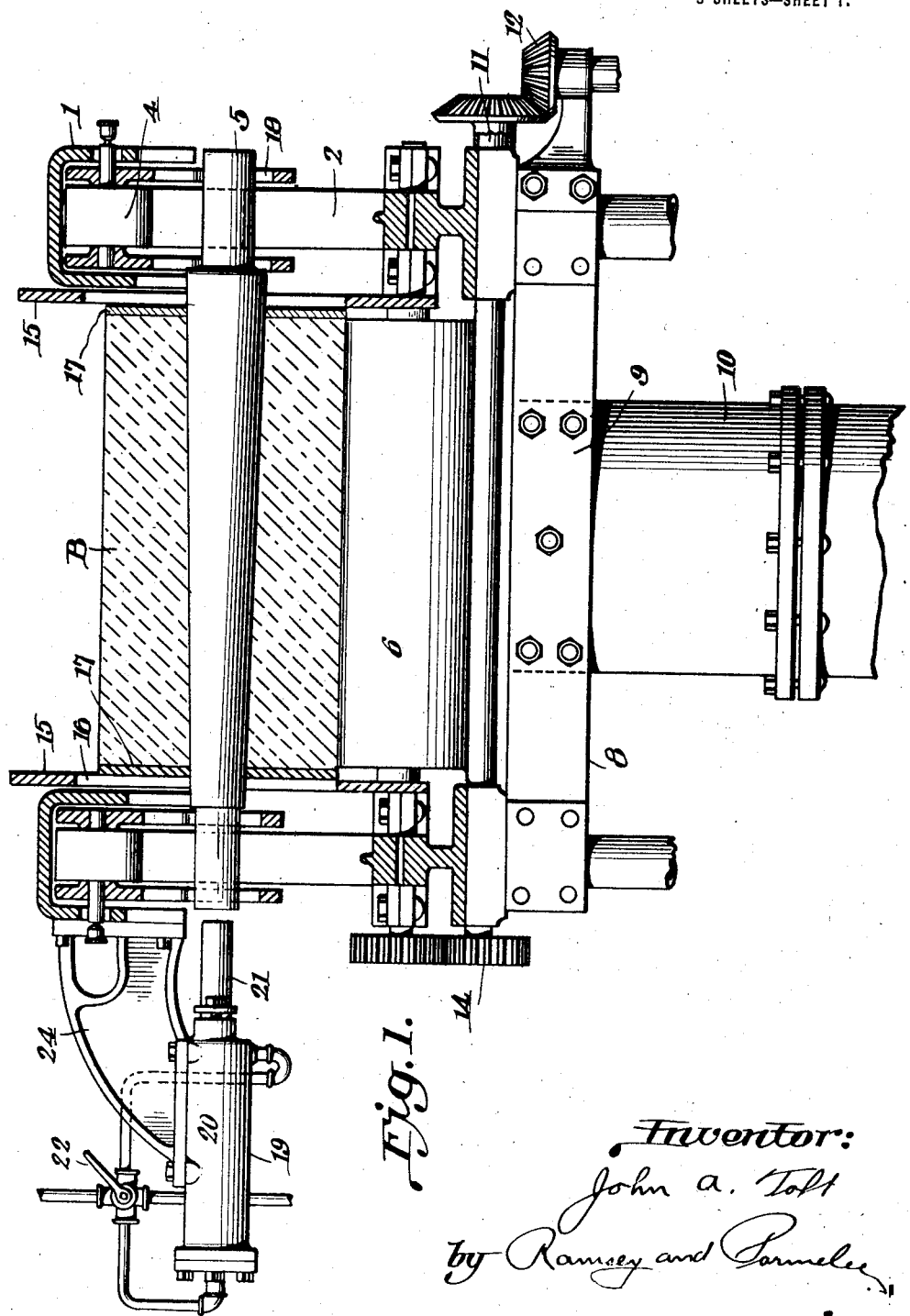
Figure 1 is a detail view illustrating the press in position to permit the core pin being expelled by the hydraulic ram.

Heretofore in the art of making round cotton bales it has been the general custom to provide a cylindrical shaft on which were mounted tapering sleeves which tapered toward the position which would correspond to the center of the completed bale. This shaft and these sleeves constituted a core upon which the cylinder cotton bale was formed. The baling operation takes place under considerable pressure so that the cotton was very tightly compressed around these sleeves. In order to remove the sleeves it was necessary to take the bales from the press mechanism and it frequently occurred that the bale was badly mutilated in attempting to remove these sleeves, because of the extremely tight grip that the cotton fibers had upon the sleeves. Furthermore, it was found that in the majority of cases the sleeves rotated upon the shaft which usually sprung slightly out of alinement under the baling pressure. The consequence of these effects was to quickly destroy the sleeves and also to produce uneven baling action. A further difficulty was also encountered in forming the ends of the bales. Various types of plates have been tried, both stationary and rotary. The rotative plates are very difficult to remove from the core, or pressed so tightly against the frame work of the press that the operation of the machine was impaired, and made the removal of the bale from between them difficult.

I find the foregoing difficulties are obviated by providing a core pin composed of a single piece of metal, preferably steel, provided on each end with suitable bearings, the pin being tapered substantially throughout the portion upon which the bale is adapted to be formed. Preferably, this core pin is hardened and ground so that it presents a smooth tapering surface. The disks which loosely fit over the ends of the core pin, and are supported on the pin against the outward thrust of the bale by plates which are connected to and have a rectilinear movement with the pressure rolls, so that in effect the circular plates float between the bale being formed and the rectilinear moving supporting plates. Then, after the bale is formed and bound, it is slightly lowered to permit the core pin to drop away from its supporting bearings and assumes a position opposite suitable ejector openings, which are alined opposite the plunger of the hydraulic ram adapted to press upon the end of the core pin adjacent the smallest tapering portion and move the core pin endwise a sufficient distance to permit the taper thereon to release the pressure of the compressed cotton upon the pin whereby the core may be entirely and easily removed. Upon removal of the pin, the compressed cotton at the center of the bale being relieved from pressure expands to fill the space previously occupied by the pin and forms a loose center in the bale which allows the air to circulate through and dry out the cotton when baled damp, and also assures the bale against a hard center, which has heretofore been one of the principal objections to cylinder bale cotton. The cotton bale then assumes a relation wherein the uniform density at which it was originally formed around the pin is changed to a minimum density at the center of the bale and a maximum density adjacent the outer portions of the bale so that there is no hard and twisted mass of cotton in the center of the bale when the bale is opened.

Referring more particularly to the drawings, the press comprises a suitable head frame 1 secured to and carried by the vertical guides 2. The head frame is preferably provided with anti-friction bearings 4 such as shown and claimed in my copending application Serial No. 139,597, filed Dec. 29, 1916. These bearings are so arranged that they engage journals on the tapered core 5 around which the cotton bale B is wrapped, and take up the thrust exerted on the core pin during the formation of the bale. Coöperating with the core 5 for suitably winding the cotton batting around the same, there may be provided a pair of pressure rolls 6 suitably journaled in the cross head 7, which is slidably mounted on the vertical guides 2. The pressure rolls may be yieldingly supported to permit sliding movement on the guides as the bale increases in diameter, by providing a cross bar 8 secured to the extension 9 formed on the piston member 10 of a hydraulic press and air cushion device. The cross head also carries a driving shaft 11 driven through the medium of bevel gears 12, and transmitting power to rotate the pressure rollers through spur gears 14.

For overcoming the difficulty heretofore experienced in forming the ends of the bale in a smooth condition, I have provided a pair of plates 15, one adjacent each end of the sliding cross head, by which they are carried, and having slots 16 formed therein for receiving the core pin 5 and permitting movement relative thereto. Mounted on the core pin within the guide plates 15 are floating head disks 17 having a diameter equal to or slightly greater than the diameter of the finished bale. It will be apparent that since the cotton batting is wound on the core pin within the limits defined by the floating disks, that the fibers adjacent the disks are kept from entering the slots in the plate 15 and interfering with the easy release of the bale from the press. The disks also protect the cotton against breaking and matting, as all wear and thrust is taken up between the disks and the plates 15.

The core pin 5 is preferably formed of hardened steel and is provided with a smooth surface to prevent the cotton batting from sticking thereto. The taper is preferably continuous throughout the greater length of the core pin, the opposite ends being slightly reduced in diameter and cylindrical in outline to form journals coöperating with the anti-friction bearings 4.

For permitting the ready insertion and withdrawal of the core pin, the head frame may be provided with elongated openings 18, the lower portions of which are of slightly greater diameter than the upper portions. In normal working operation the core pin is held in its uppermost position against the antifriction bearings by the upward pressure exerted by the pressure rolls. As the bale increases in diameter the rolls gradually descend against the action of the entrapped air in the piston 10 so that a gradually increasing pressure is exerted on the bale. After the formation of the bale the pressure within the piston may be relieved in any suitable manner, as by permitting the escape of the liquid contained in the press mechanism, so that the core pin and the bale are permitted to drop a slight distance in order to bring the pin in to alinement with the lower, enlarged portion of the openings in the head frame. In this position the core pin may be forced outwardly by means of a suitably constructed ejecting device 19. In the present embodiment I have illustrated this device as comprising a hydraulic or other fluid pressure cylinder 20 carrying the piston 21 adapted to be reciprocated in either direction by means of fluid pressure which may be admitted or exhausted to or from either end of the cylinder by means of the valve 22 and the connected piping. The ejecting mechanism is preferably rigidly secured to the head frame of the press mechanism by means of a bracket arm 24, and so supported that the piston 21 thereof alines at all times with the center of the enlarged portion of the openings in the head frame. It will now be apparent that as soon as the core is dropped to its lower position that the pin will be in alinement with the piston by means of which it may be forced outwardly from the bale.

Since the bale formed by this press is subjected to a considerable degree of pressure, the removal of the pin is accompanied by a gradual expansion of the cotton fibers, thereby completely closing the space formerly occupied by the core and leaving a loose center through which the air may circulate. Thus, the completed bale is slightly less compact at the central portion than at the periphery, so that upon opening the bale for use, the cotton fibers at the center of the core are found to be in perfect unmatted condition.

Where the core pin is constructed as shown in the patent to S. H. Dunlap, 1,087,002, of February 10, 1914, for example in two or more parts having opposite directed tapered surfaces the removal of the same after the bale is taken from the machine saves delay and often times the center part of the bale is drawn out with the sleeve destroying the shape of the bale. By using a single core pin as herein shown, the same may be removed while the bale is supported by the press with no damage to the bale. This feature has been found to be highly desirous in the production of commercially salable bales of cotton, for if the center of the bale is in a hard matted condition it destroys the fiber.

Since the results which it is desired to obtain by this construction may be obtained by mechanisms differing slightly in structure, it is intended that the drawings shall only be considered as representative of a preferred embodiment of my invention.

What I claim is:—

1. In a cotton bale forming machine, in combination, a core, a sliding cross head below said core, pressure rolls carried thereby for wrapping cotton around the core, floating disks carried by the core adjacent the opposite ends thereof, and guide plates on the cross head coöperating with the disks.

2. In a cotton bale forming machine, in combination, a core, a sliding cross head below said core, pressure rolls carried thereby for wrapping cotton around the core, disks carried by the core adjacent the opposite ends thereof, and guide plates on the cross head coöperating with said disks, said guide plates being slotted to receive the core pin.

3. A core pin for cotton baling presses, comprising a hardened steel pin adapted to extend entirely through the bale, having journals formed on its opposite ends, uniformly tapered throughout the greater portion of its length, with portions beyond the tapered portion engageable to prevent longitudinal movement of the pin, said pin having its bat receiving surface polished to prevent adhesion of the cotton fibers thereto.

4. In a cotton baling machine, in combination, a tapered core pin, bearing means for supporting said core pin, means to prevent endwise movement of the core pin when in contact with said bearing means, means for wrapping cotton around said pin, and means carried by the machine adjacent one end of the pin and normally out of alinement therewith for pushing the same from a finished bale.

5. In a cotton bale forming machine, in combination, a head frame, bearings mounted in said head frame, a core pin coöperating with said bearings, shoulders on the ends of said core pin to prevent endwise movement of the core pin while in contact with said bearings, means for wrapping cotton around said core pin, and means carried by the head frame adjacent one end of the core pin and normally out of alinement therewith for pushing the same from a finished bale.

6. In a cotton bale forming machine, in combination, a head frame having elongated openings formed therein, said openings being of different diameters throughout different portions of their length, bearings carried by the head frame, a core pin adapted to be inserted through said openings to coöperate with the bearings, means for wrapping cotton around said core pin, means for lowering the pin to bring the same into alinement with the larger diameter of said openings, and means for forcing the pin from the bale of cotton formed thereon.

7. In a cotton bale forming machine, in combination, a head frame, a core pin journaled in said frame, overhead bearings adapted to support the core pin during baling, an ejecting device mounted on the frame below the normal axis of the pin and normally out of contact with said pin for pushing the same outwardly from a finished bale.

8. In a cotton bale forming machine, in combination, a tapering core pin, means for wrapping cotton around said pin, floating disks loosely carried by the pin adjacent the opposite ends thereof, and an ejecting device mounted on the machine for forcing the core pin outwardly through said disks and from a finished bale.

9. In a cotton bale forming machine, in combination, a head frame, a core pin journaled in said frame, bearings to support the core pin during baling, means for wrapping cotton around said pin, floating disks loosely carried by the pin adjacent the opposite ends thereof, means to prevent endwise movement of the core pin during the wrapping specified, and an ejecting device mounted on the head frame for forcing the core pin outwardly from a finished bale.

10. In a cotton baling machine, in combination, a core pin, means for supporting said core pin during baling, compressing means for wrapping cotton around said pin, devices to prevent endwise movement of the core pin during said wrapping operation, core removing means carried by the machine adjacent one end of the pin and normally out of engagement therewith for forcing the same from a finished bale, and means for operating the compressing means to present the pin to the core removing means.

11. In a cotton bale forming machine, in combination, a head frame, a tapered core pin journaled in said frame, overhead bearings for supporting the core pin during baling, means to prevent endwise movement of the core pin while in contact with said bearings, an ejecting device mounted on the frame below the axis of the core pin for pushing the same outwardly therefrom, and means for lowering the bale to bring the core into alinement with said ejecting device.

12. In a cotton bale forming machine, in combination, a head frame, a tapered core pin journaled in said frame, a fluid pressure device secured to said frame below the normal axis of the core pin for forcing the same outwardly therefrom, means to prevent endwise movement of the core pin when in normal position, and means for lowering the bale to bring the core into alinement with said ejecting device.

13. In a cotton baling machine, in combination, a tapered core pin, bearing means for supporting said core pin, means to prevent endwise movement of the core pin while in engagement with said bearings, means for wrapping cotton around said pin, means carried by the machine adjacent one end of the pin and normally out of alinement therewith for ejecting the same from a finished bale, and means for lowering the wrapping means to bring the core into alinement with said ejecting means.

14. In a baling machine, the combination of a core for receiving the bale, compressing means operable to compress the bat upon the core, retaining means associated with the core for holding it to the operation of the compressing means, said compressing means and retaining means being mounted for relative movement to accommodate increase in size of the bale, disks movable with the core and arranged to form the ends of the bale, and guide members operably associated with the disks and movable relative thereto and effective to maintain the disks in operative position during the forming of the bale.

15. In a winding machine, the combination of compressing mechanism, a core operably associated therewith to receive the material therefrom, said core being movable toward and from the compressing mechanism to accommodate increase in size of the bale, disks associated with the core to shape the ends of the bale and movable with said core to and from the compressing mechanism, guide members operably associated with the disks in such manner as to permit movement thereof, said guide members being effective to maintain the disks in operative position at all positions of the core.

16. In a baling press, the combination of compressing mechanism, a movable core associated with the compressing mechanism and adapted to receive the bat therefrom, means supported on the core for forming the ends of the bale, guide members for guiding the core toward and from the compressing mechanism, retaining members adapted to hold the core to the operation of the compressing mechanism, said retaining members including portions effective to hold the core against lateral movement and endwise movement and portions adapted to retain the core against lateral movement while permitting its endwise movement, and means for accomplishing relative movement of the compressing mechanism and retaining members whereby to position the core selectively in either of said portions of the retaining members.

17. In a baling press, the combination of a movable core for receiving the bale, compressing mechanism for supporting the bale, retaining members for holding the core to the operation of the compressing mechanism and for limiting the lateral movement of the core, said retaining members having portions effective to limit the endwise movement of the core and portions effective to permit endwise movement thereof, the core being movable into association with said portions selectively.

18. In a baling machine, the combination of a movable core for receiving the bale, compressing mechanism for applying the bat to the core, retaining means for holding the core in operable association with the compressing mechanism, disks movable with the core and effective to shape the ends of the bale, core removing means effective upon the core in a predetermined position to remove the same from the bale, and guide members associated with the disks and the compressing mechanism, and effective to maintain the bale in proper association with the compressing mechanism independently of endwise movement of the core.

19. In a machine of the class described, the combination with compressing mechanism of a core movable relative thereto and adapted to receive the bat therefrom, retaining means for guiding the core, guide members for guiding the bale independently of the core, and core removing means operable to move the core relative to the bale.

20. In a baling machine, the combination of a movable core for receiving the bale, compressing mechanism for applying the bat to the core, retaining means for holding the core in operable association with the compressing mechanism, disks movable with the core and effective to shape the ends of the bale, and guide members associated with the disks and the compressing mechanism, and effective to maintain the bale in proper association with the compressing mechanism independently of endwise movement of the core.

21. In a baling machine, the combination of a movable core for receiving the bale, compressing mechanism for applying the bat to the core, retaining means for holding the core in operable association with the compressing mechanism, disks movable with the core and effective to shape the ends of the bale, and guide members associated with the core and the compressing mechanism, and effective to maintain the bale in proper association with the compressing mechanism independently of endwise movement of the core.

JOHN A. TAFT.